United States Patent
Ko et al.

(10) Patent No.: US 10,001,630 B1
(45) Date of Patent: Jun. 19, 2018

(54) WIDE-ANGLE LENS

(71) Applicant: HON HAI PRECISION INDUSTRY CO., LTD., New Taipei (TW)

(72) Inventors: Chun-Cheng Ko, New Taipei (TW); Ming-Lin Lee, New Taipei (TW); Tsung-Heng Chang, New Taipei (TW); Chia-Wen Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days. days.

(21) Appl. No.: 15/493,138

(22) Filed: Apr. 21, 2017

Related U.S. Application Data

(60) Provisional application No. 62/478,044, filed on Mar. 29, 2017.

(51) Int. Cl.
*G02B 9/04* (2006.01)
*G02B 13/18* (2006.01)
*G02B 9/64* (2006.01)

(52) U.S. Cl.
CPC ............... *G02B 13/18* (2013.01); *G02B 9/64* (2013.01)

(58) Field of Classification Search
CPC ................................ G02B 13/18; G02B 9/64
See application file for complete search history.

(56) References Cited

U.S. PATENT DOCUMENTS 8,654,451 B2 * 2/2014 Kunugise ............... G02B 15/14
359/691

* cited by examiner

*Primary Examiner* — Joseph P Martinez
(74) *Attorney, Agent, or Firm* — ScienBiziP, P.C.

(57) ABSTRACT

A wide-angle lens includes a first lens group having a positive refractive power, a second lens group having a positive refractive power and an aperture. The first lens group, the aperture and the second lens group are arranged in sequence from the object side to the image side. The first lens group includes five lens, and the second lens group includes four lens.

20 Claims, 4 Drawing Sheets

WIDE-ANGLE LENS

FIELD

The subject matter herein generally relates to a wide-angle lens.

BACKGROUND

A lens having light incident angle more than or equal to 180° is a fisheye lens or wide-angle lens. A conventional wide-angle lens usually adopts full glass architecture, so the resolution of the conventional wide-angle lens is low, and the cost of it is high. Therefore, it is desirable to improve the resolution and reduce the cost of the wide-angle lens.

BRIEF DESCRIPTION OF THE DRAWINGS

Implementations of the present technology will now be described, by way of example only, with reference to the attached figures.

DETAILED DESCRIPTION

Figure 1:
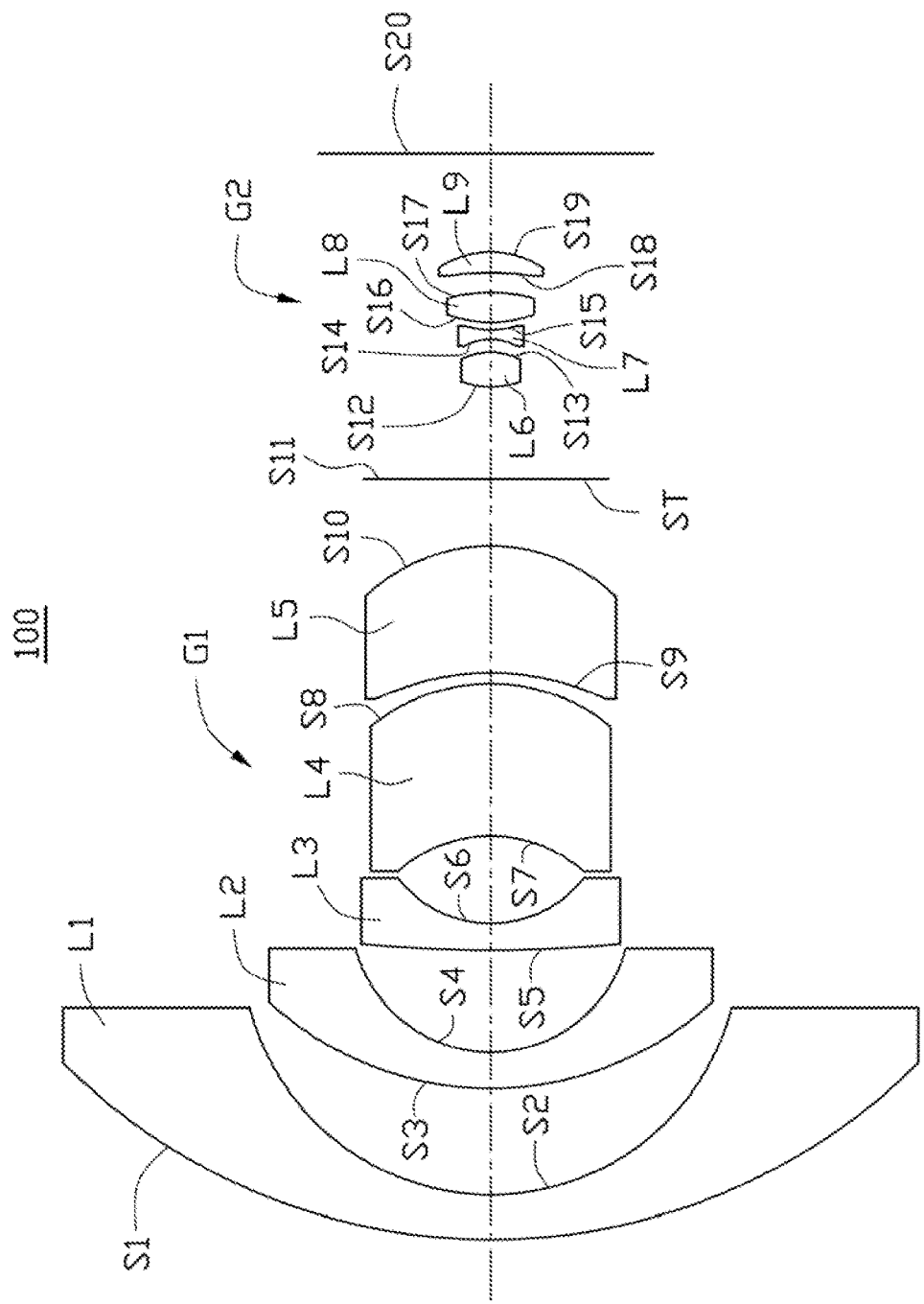
FIG. 1 is a lens layout diagram of a wide-angle lens in accordance with an exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean at least one.

The term "comprising" when utilized, means "including, but not necessarily limited to"; it specifically indicates open-ended inclusion or membership in the so-described combination, group, series and the like.

FIG. 1 illustrates a lens layout diagram of a wide-angle lens in accordance with an exemplary embodiment of the present disclosure.

A wide-angle lens 100 comprises a first lens group G1, an aperture ST, and a second lens group G2. The first lens group G1, the aperture ST, and the second lens group G2 are arranged in sequence from an object side to an image side. The aperture ST is arranged between the first lens group G1 and the second lens group G2.

The first lens group G1 has a positive refractive power. The first lens group G1 comprises a first lens L1, a second lens L2, a third lens L3, a fourth lens L4, and a fifth lens L5. The first lens L1, the second lens L2, the third lens L3, the fourth lens L4, and the fifth lens L5 are arranged in sequence from the object side to the image side.

The first lens L1 has a negative refractive power. The first lens L1 is a convex-concave lens. A convex surface S1 faces the object side, and a concave surface S2 faces the image side. The first lens L1 can be made of glass.

The second lens L2 has a negative refractive power. The second lens L2 is a convex-concave lens. A convex surface S3 faces the object side, and a concave surface S4 faces the image side. The second lens L2 can be made of glass.

The third lens L3 has a negative refractive power. The third lens L3 is a convex-concave lens. A convex surface S5 faces the object side, and a concave surface S6 faces the image side. The third lens L3 can be made of glass.

The fourth lens L4 has a negative refractive power. The fourth lens L4 is a concave-convex lens. A concave surface S7 faces the object side, and a convex surface S8 faces the image side. The two surfaces S7 and S8 are aspheric surfaces. The fourth lens L4 can be made of plastic.

The fifth lens L5 has a positive refractive power. The fifth lens L5 is a concave-convex lens. A concave surface S9 faces the object side, and a convex surface S10 faces the image side. The two surfaces S9 and S10 are aspheric surfaces. The fifth lens L5 can be made of plastic.

The six surfaces S1, S2, S3, S4, S5, and S6 are spherical surfaces.

The second lens group G2 has a positive refractive power. The second lens group G2 comprises a sixth lens L6, a seventh lens L7, an eighth lens L8, and a ninth lens L9. The sixth lens L6, the seventh lens L7, the eighth lens L8, and the ninth lens L9 are arranged in sequence from the object side to the image side.

The sixth lens L6 has a positive refractive power. The sixth lens L6 is a bi-convex lens. A convex surface S12 faces the object side, and another convex surface S13 faces the image side. The two surfaces S12 and S13 are aspheric surfaces. The sixth lens L6 can be made of glass.

The seventh lens L7 has a negative refractive power. The seventh lens L7 is a bi-concave lens. A concave surface S14 faces the object side, and another concave surface S15 faces the image side. The two surfaces S14 and S15 are aspheric surfaces. The seventh lens L7 can be made of plastic.

The eighth lens L8 has a positive refractive power. The eighth lens L8 is a bi-convex lens. A convex surface S16 faces the object side, and another convex surface S17 faces the image side. The two surfaces S16 and S17 are aspheric surfaces. The eighth lens L8 can be made of plastic.

The ninth lens L9 has a positive refractive power. The ninth lens L9 is a concave-convex lens. A concave surface S18 faces the object side, and a convex surface S19 faces the image side. The two surfaces S18 and S19 are aspheric surfaces. The ninth lens L9 can be made of plastic.

The wide-angle lens 100 satisfies the following conditions:

$0 < (IHR - IHI)/IHI < 0.5;$ $-3.4 < SF1 < -1.4;$ $-3.4 < SF2 < -1.4;$ $1.0 < Y8/T4;$ $1.3 < Y10/T5;$ $C_{bst}14 < 0$ and $C_{bst}25 < 0;$ and at least one surface of the second lens group is an aspheric surface.

Of the conditions, IHR is maximum image height, $IHI=\omega*f$, $\omega$ is incident angle (Semi-FOV), unit is radian, and f is system focal length.

If (IHR−IHI)/IHI is beyond an upper limit of the above conditions, an image center will be significantly compressed, and a quality of image center will be decreased. If (IHR−IHI)/IHI is beyond a lower limit of the above conditions, an image edge will be significantly compressed, and a quality of image edge will be decreased.

$SFi=(C1i+C2i)/(C1i-C2i)$, i=1,2, C1i is a curvature of a surface facing the object side of an i th lens, C2i is a curvature of a surface facing the image side of an i th lens, and SFi is a shape factor.

If SFi is beyond an upper limit of the above conditions, a distinguishability of a wide-angle field of view will be decreased, and difficulties in placing a wide-angle field of view on the imaging plane are encountered. If SFi is beyond a lower limit of the above conditions, a manufacturability of lens will be decreased and a cost will be raised.

Y8 is an effective clear aperture diameter of the surface S8 in a maximum angle of incidence, and Y10 is an effective clear aperture diameter of the surface S10 in a maximum angle of incidence. T4 is a central thickness from the surface S7 to the surface S8, and also is a thickness of the fourth lens L4. T5 is a central thickness from the surface S9 to the surface S10, and also is a thickness of the fifth lens L5.

If each of Y8/T4 and Y10/T5 is beyond the above conditions, a manufacturability of lens will be decreased and a cost will be raised.

$C_{bst}14$ is a best fitting curvature of a surface facing the object side of the fourth lens L4, a fitting range is from 0 to a maximum effective radius, $C_{bst}25$ is a best fitting curvature of a surface facing the image side of the fifth lens L5, and a fitting range is from 0 to a maximum effective radius.

The ranges of $C_{bst}14$ and $C_{bst}25$ in the above conditions can contribute to good system performance.

From the surface S12 to the surface S19, at least one surface being an aspheric surface improves an optical image quality.

The lens system of this disclosure satisfies the above conditions. Even in case of a wide-angle field of view of a large aperture, the lens system will maintain a good imaging quality.

Figure 2:
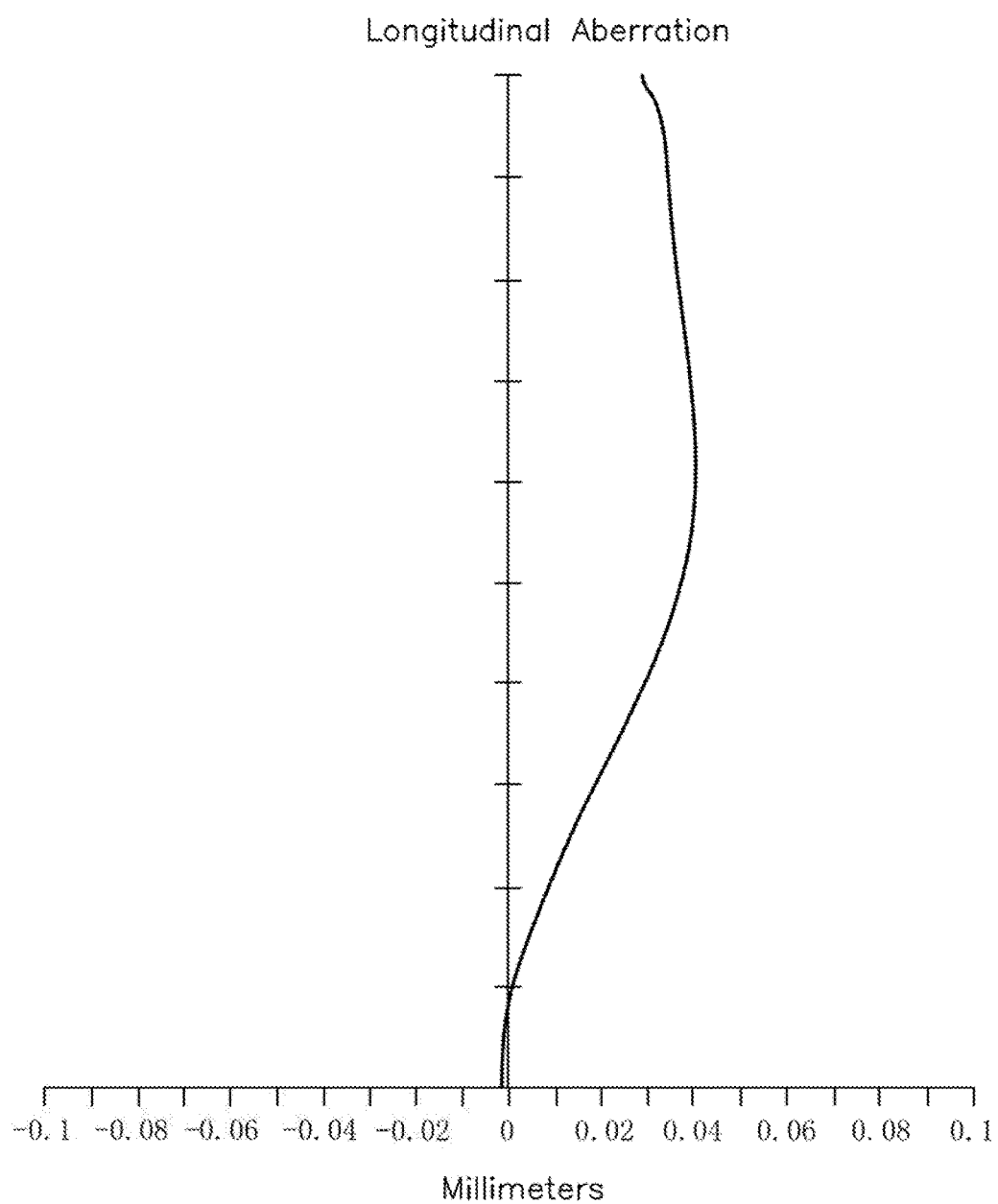
FIG. 2 depicts a longitudinal aberration diagram of a wide-angle lens in a wavelength of 587 nm in accordance with an exemplary embodiment of the present disclosure.

In at least one embodiment, a longitudinal aberration diagram of an exemplary embodiment of the wide-angle lens 100 in a wavelength of 587 nm is shown in FIG. 2, and a vertical axis is a relative field numeric.

Figure 3:
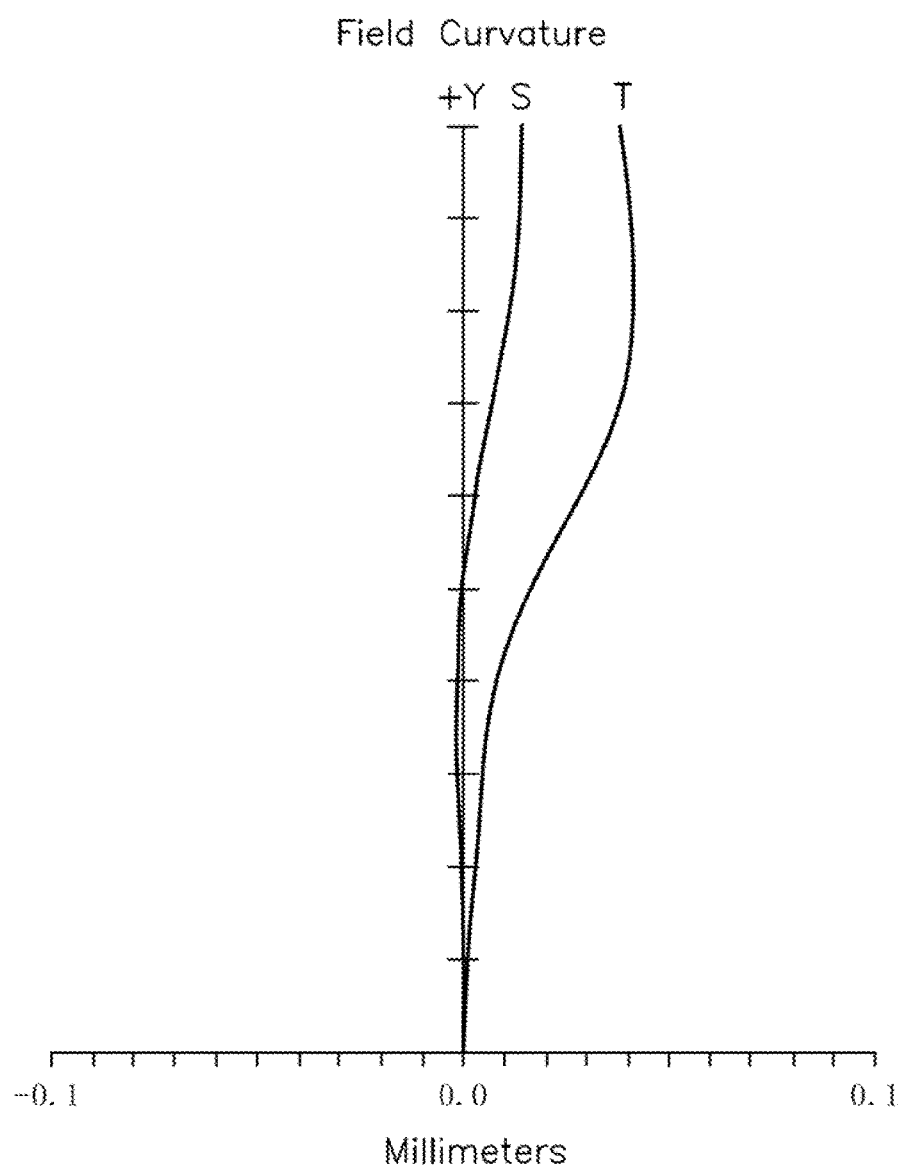
FIG. 3 is a field curvature diagram of a wide-angle lens in a wavelength of 587 nm in accordance with an exemplary embodiment of the present disclosure.

In at least one embodiment, a field curvature diagram of an exemplary embodiment of the wide-angle lens 100 in a wavelength of 587 nm is shown in FIG. 3, and a vertical axis is a relative field numeric.

Figure 4:
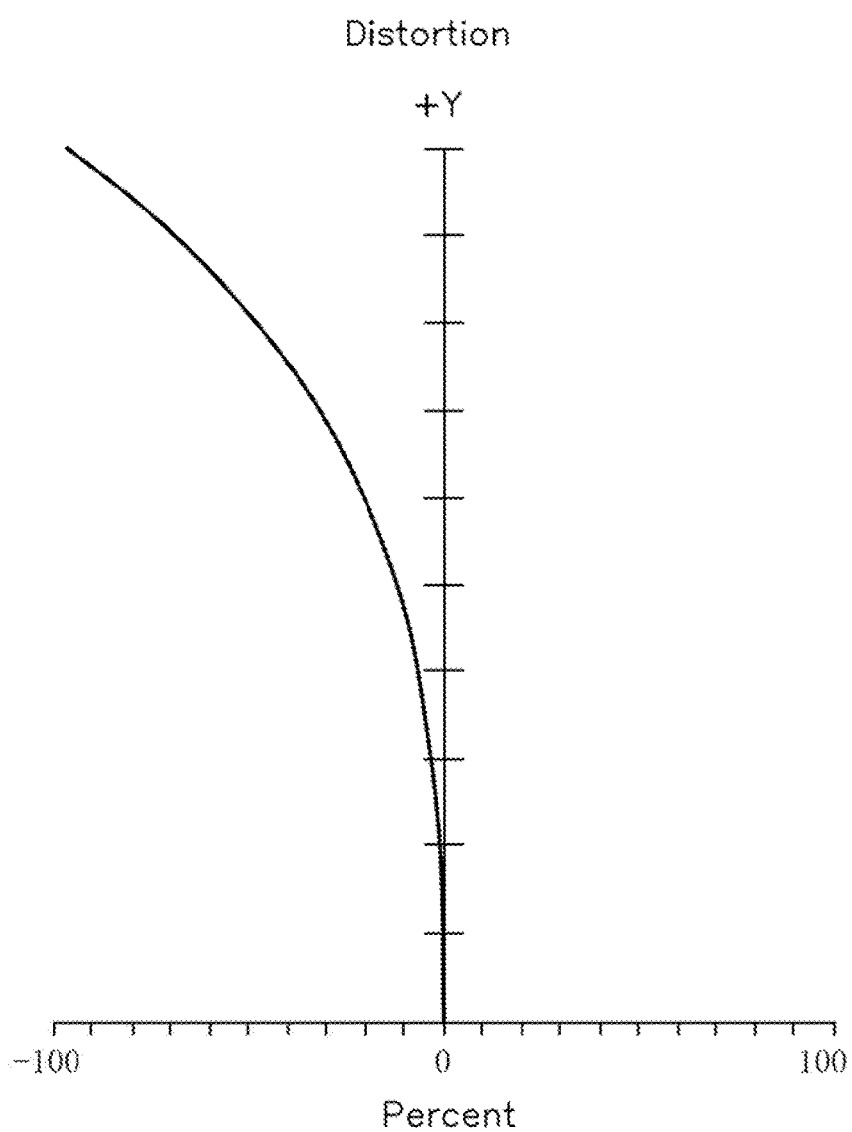
FIG. 4 is a distortion diagram (f*tan θ) of a wide-angle lens in a wavelength of 587 nm in accordance with an exemplary embodiment of the present disclosure.

In at least one embodiment, a distortion diagram of an exemplary embodiment of the wide-angle lens 100 in a wavelength of 587 nm is shown in FIG. 4, and a vertical axis is a relative field numeric.

In at least one embodiment, a radius of curvature R of each lens surfaces, a distance d in an optical axis between each adjacent lens surfaces, a refractive index Nd of each lens, and an abbe number of each lens are shown in Table 1.

TABLE 1

| surface | R(mm) | d (mm) | refractive index | abbe number | remark |
|---|---|---|---|---|---|
| S1 | 29.2909 | 2.3865 | 1.806 | 41.00 | L1 |
| S2 | 12.2744 | 5.1328 | | | |
| S3 | 16.1766 | 1.6535 | 1.804 | 46.6 | L2 |
| S4 | 6.794 | 5.1229 | | | |
| S5 | 82.6538 | 1.2012 | 1.64 | 60.2 | L3 |
| S6 | 6.2407 | 4.2648 | | | |
| S7 | −5.5241 | 7.4709 | 1.544 | 56.00 | L4 |
| S8 | −8.6995 | 0.3750 | | | |
| S9 | −12.5165 | 6.3058 | 1.544 | 56.00 | L5 |
| S10 | −6.2516 | 9.8205 | | | |
| S11 | infinity | 0.2426 | | | aperture (ST) |
| S12 | 4.4027 | 1.6888 | 1.589 | 61.3 | L6 |
| S13 | −3.8501 | 0.7362 | | | |
| S14 | −2.6508 | 0.3804 | 1.642 | 22.5 | L7 |
| S15 | 4.0385 | 0.2402 | | | |
| S16 | 6.1489 | 1.5593 | 1.544 | 56.00 | L8 |
| S17 | −3.6755 | 0.7822 | | | |
| S18 | −37.2014 | 1.1781 | 1.544 | 56.00 | L9 |
| S19 | −3.3096 | 0.9428 | | | |
| S20 | Infinity | — | | | imaging plane |

Formula definition of aspheric surfaces is:

$$Z(y) = \frac{h^2/R}{1+\sqrt{1-(1+K)(h/R)^2}} + Ah^4 + Bh^6 + Ch^8 + Dh^{10} + Eh^{12} + Fh^{14} + Gh^{16}$$

Of the formula, Z is an aspheric surface sag of each lens surface; R is a radius of curvature; h is a radial distance of the lens surface from the optical axis; K is a conic constant; A, B, C, D, E, F, G are aspheric coefficients of each lens surface.

In at least one embodiment, aspheric coefficients of each lens surfaces are shown in Table 2 and Table 3.

TABLE 2

| | aspheric coefficient | | | | | |
|---|---|---|---|---|---|---|
| | S7 | S8 | S9 | S10 | S12 | S13 |
| K | −7.5036 | 0 | 0 | −1.2129E+00 | 6.5091E−01 | −5.7018E+00 |
| A | −1.7962E−03 | −1.3493E−04 | −3.6485E−04 | 4.5817E−04 | −3.3196E−04 | −4.5066E−03 |
| B | 6.8894E−05 | 6.4806E−06 | 2.508E−05 | −1.7969E−05 | 1.6922E−03 | −1.0533E−02 |
| C | −4.1945E−06 | 5.5463E−07 | −2.5033E−07 | 5.1278E−07 | −2.2530E−05 | 5.0457E−04 |
| D | 5.9912E−08 | −1.2071E−08 | 6.2145E−09 | −7.4536E−09 | −7.4136E−04 | 1.7971E−04 |
| E | 6.0825E−09 | −3.3319E−10 | −2.0391E−10 | 6.9613E−11 | 1.6629E−04 | −9.3798E−05 |
| F | −3.4061E−10 | 6.9063E−12 | −1.1726E−11 | −2.0427E−12 | 1.6334E−04 | −4.3662E−05 |
| G | 5.3227E−12 | 1.6675E−14 | 2.9511E−13 | 2.8848E−14 | −6.1006E−05 | 2.1147E−05 |

TABLE 3

| | aspheric coefficient | | | | | |
|---|---|---|---|---|---|---|
| | S14 | S15 | S16 | S17 | S18 | S19 |
| K | 1.1979 | −9.9020 | 3.7069 | −3.5826 | 0 | −2.0246E+01 |
| A | −1.2949E−02 | 8.8588E−04 | 1.4665E−02 | −3.4076E+00 | −4.8494E−03 | −1.2674E−02 |
| B | −4.9429E−03 | 3.1707E−03 | −1.9739E−03 | 1.5701E−02 | 6.8481E−04 | −1.2964E−03 |
| C | −9.7203E−04 | 1.0554E−04 | −3.1126E−04 | 2.0425E−03 | 1.6703E−04 | 2.3835E−04 |
| D | −3.7905E−04 | −1.2912E−04 | 6.6372E−07 | −6.4861E−04 | −6.8219E−06 | 2.7548E−05 |
| E | 1.9959E−04 | −6.7569E−05 | 1.2477E−05 | −1.8964E−05 | −2.1874E−07 | 1.3364E−06 |
| F | −6.1644E−06 | −1.1447E−05 | 1.7330E−06 | 5.7856E−06 | 1.3488E−08 | −1.7446E−07 |
| G | −5.0853E−05 | 3.2229E−06 | −7.8937E−07 | 1.0819E−06 | −1.6147E−08 | −5.2153E−08 |

In at least one embodiment, an Effective Focal Length, an F-number, and a field of view angle in one embodiment are shown in Table 4.

TABLE 4

| EFL | F/NO | FOV(2□) |
|---|---|---|
| 0.89 | 2.20 | 210 |

Data in one embodiment are shown in Table 5.

TABLE 5

| (IHR-IHI)/IHI | SF1 | SF2 | Y8 | T4 | Y10 | T5 | Y8/T4 | Y10/T5 | $C_{bst}14$ | $C_{bst}25$ | aspheric surface |
|---|---|---|---|---|---|---|---|---|---|---|---|
| 0.42 | −2.44 | −2.44 | 11.87 | 7.47 | 12.29 | 6.30 | 1.59 | 1.95 | −0.146 | −0.118 | S7, S8, S9, S10, S12, S13, S14, S15, S16, S17, S18, S19 |

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A wide-angle lens comprising:
a first lens group having a positive refractive power and comprising:
a first lens having a negative refractive power;
a second lens having a negative refractive power;
a third lens having a negative refractive power;
a fourth lens having a negative refractive power; and
a fifth lens having a positive refractive power, and the first lens, the second lens, the third lens, the fourth lens, and the fifth lens being arranged in sequence from an object side to an image side;
a second lens group having a positive refractive power and comprising:
a sixth lens having a positive refractive power;
a seventh lens having a negative refractive power;
an eighth lens having a positive refractive power; and
a ninth lens having a positive refractive power, and the sixth lens, the seventh lens, the eighth lens, and the ninth lens being arranged in sequence from the object side to the image side; and
an aperture arranged between the first lens group and the second lens group, and the first lens group, the aperture, and the second lens group being arranged in sequence from the object side to the image side.

2. The wide-angle lens of claim 1, wherein the first lens is a convex-concave lens having a convex surface facing the object side and a concave surface facing the image side.

3. The wide-angle lens of claim 1, wherein the second lens is a convex-concave lens having a convex surface facing the object side and a concave surface facing the image side.

4. The wide-angle lens of claim 1, wherein the third lens is a convex-concave lens having a convex surface facing the object side and a concave surface facing the image side.

5. The wide-angle lens of claim 1, wherein the fourth lens is a concave-convex lens having a concave surface facing the object side and a convex surface facing the image side.

6. The wide-angle lens of claim 1, wherein the fifth lens is a concave-convex lens having a concave surface facing the object side and another convex surface facing the image side.

7. The wide-angle lens of claim 1, wherein the sixth lens is a bi-convex lens having a convex surface facing the object side and another convex surface facing the image side.

8. The wide-angle lens of claim 1, wherein the seventh lens is a bi-concave lens having a concave surface facing the object side and another concave surface facing the image side.

9. The wide-angle lens of claim 1, wherein the eighth lens is a bi-convex lens having a convex surface facing the object side and another convex surface facing the image side.

10. The wide-angle lens of claim 1, wherein the ninth lens is a concave-convex lens having a concave surface facing the object side and a convex surface facing the image side.

11. The wide-angle lens of claim 2, wherein the convex surface and the concave surface are spherical surfaces.

12. The wide-angle lens of claim 3, wherein the convex surface and the concave surface are spherical surfaces.

13. The wide-angle lens of claim 4, wherein the convex surface and the concave surface are spherical surfaces.

14. The wide-angle lens of claim 5, wherein the concave surface and the convex surface are aspheric surfaces.

15. The wide-angle lens of claim 6, wherein the concave surface and the convex surface are aspheric surfaces.

16. The wide-angle lens of claim 7, wherein the convex surface and the another convex surface are aspheric surfaces.

17. The wide-angle lens of claim 8, wherein the concave surface and the another concave surface are aspheric surfaces.

18. The wide-angle lens of claim 9, wherein the convex surface and the another convex surface are aspheric surfaces.

19. The wide-angle lens of claim 10, wherein the concave surface and the convex surface are aspheric surfaces.

20. The wide-angle lens of claim 1, wherein the wide-angle lens has the following conditions:

$0<(IHR-IHI)/IHI<0.5;$ $-3.4<SF1<-1.4;$ $-3.4<SF2<-1.4;$ $1.0<Y8/T4;$ $1.3<Y10/T5;$ $C_{bst}14<0$ and $C_{bst}25<0;$ and at least one surface of the second lens group is an aspheric surface, wherein of the conditions, IHR is a maximum image height, $IHI=\omega*f$, $\omega$ is incident angle, unit is radian, f is a system focal length;

$SFi=(C1i+C2i)/(C1i-C2i)$, i=1, 2, C1i is a curvature of a surface facing the object side of an i th lens, C2i is a curvature of a surface facing the image side of an i th lens;

Y8 is an effective clear aperture diameter of a surface facing the image side of the fourth lens in a maximum angle of incidence;

Y10 is an effective clear aperture diameter of a surface facing the image side of the fifth lens in a maximum angle of incidence;

T4 is a thickness of the fourth lens;

T5 is a thickness of the fifth lens;

$C_{bst}14$ is a best fitting curvature of a surface facing the object side of the fourth lens; and $C_{bst}25$ is a best fitting curvature of a surface facing the image side of the fifth lens.

* * * * *